Sept. 13, 1955 R. K. ANDRÉ 2,717,466
FISH SPEAR
Filed March 17, 1953 2 Sheets-Sheet 1
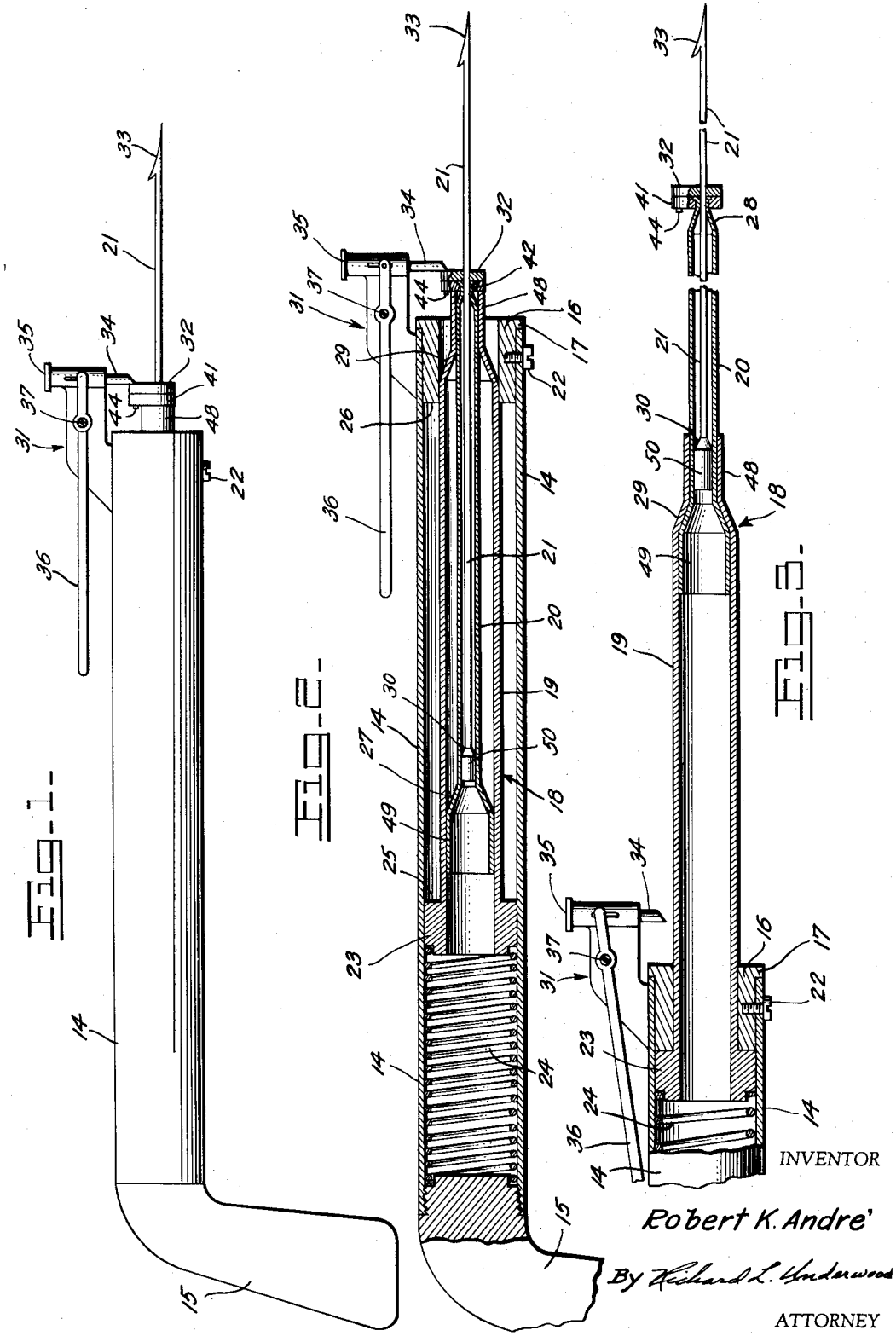
INVENTOR
Robert K. André
By Richard L. Underwood
ATTORNEY Sept. 13, 1955    R. K. ANDRÉ    2,717,466
FISH SPEAR
Filed March 17, 1953    2 Sheets-Sheet 2
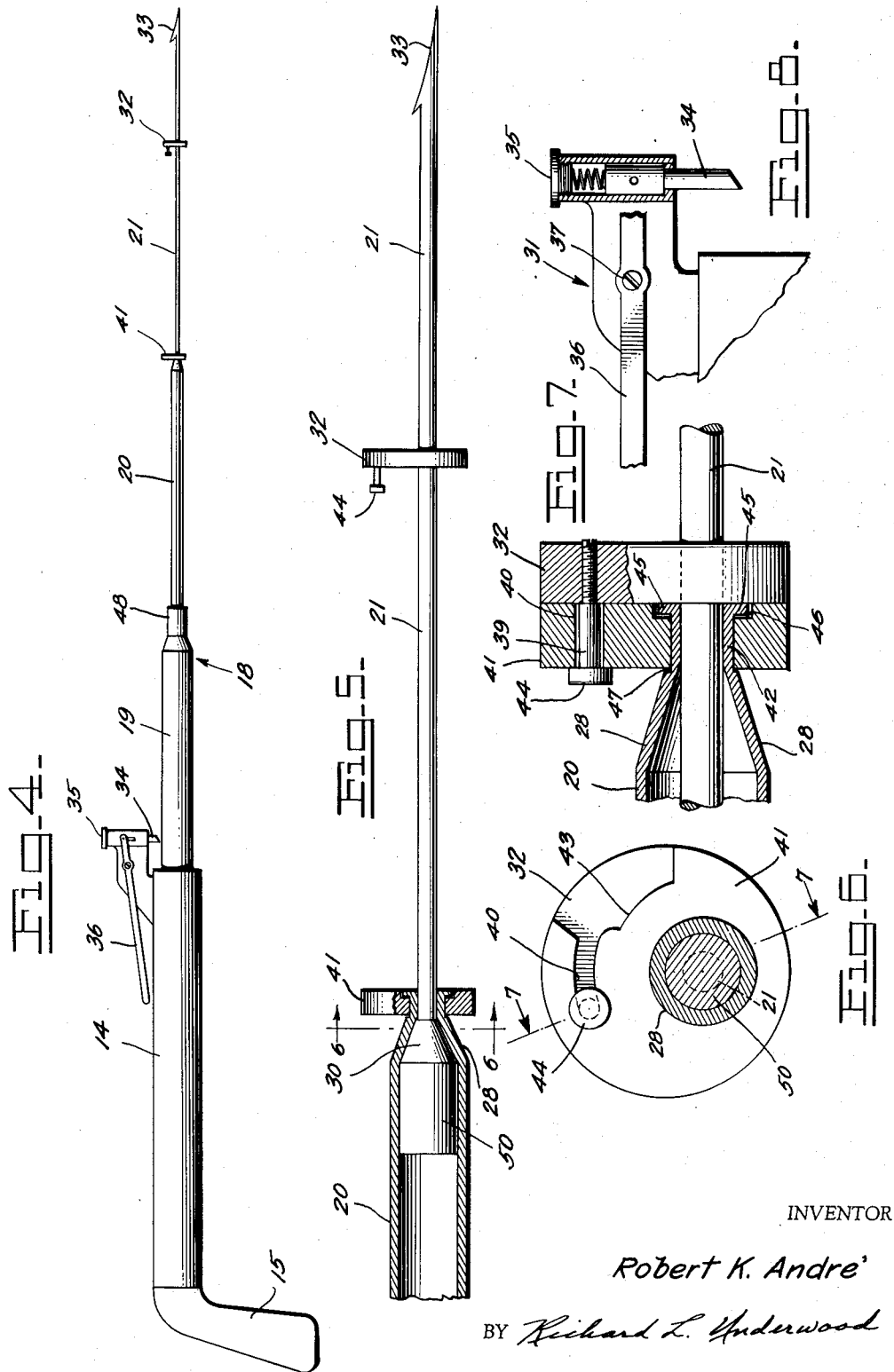
INVENTOR
Robert K. André
BY Richard L. Underwood
ATTORNEY

United States Patent Office 2,717,466
Patented Sept. 13, 1955

2,717,466

FISH SPEAR

Robert K. André, South Miami, Fla.

Application March 17, 1953, Serial No. 342,813

3 Claims. (Cl. 43—6)

This invention relates to fish spears and more particularly to a fish spear which employs a novel structural combination for operation.

Many different types of fish spears are now in use and have to some extent proved quite satisfactory. However, to my knowledge none of these fish spears is capable of long-range use and short range use with equal accuracy. My invention is directed to a fish spear capable of use at various ranges, for example up to nine feet and more, while not sacrificing the effectiveness at short range, i. e., three to six feet.

These highly desirable results are now possible through the employment of my device wherein power is transferred to the spear itself through a novel telescoping tube design wherein momentum is the intermediate and/or final driving force.

The patents of the prior art have in all cases known to me relied for their power upon power means directly connected to the extensible fish spear members. My invention adds to this design feature of the prior art extensible members which move outwardly under their own momentum, thereby obtaining increased range without sacrificing compactness and simplicity of structural design which is so vitally important in devices of this nature.

Various other objects and meritorious features of the invention will be apparent from the following description taken in conjunction with the drawings, wherein like numerals refer to like parts throughout the several figures and wherein:

Fig. 1 is a side view showing my fish spear in a cocked condition;

Fig. 2 is a slightly enlarged scale side view in section;

Fig. 3 is somewhat similar to Fig. 2, showing the short range initial extension stage immediately following firing;

Fig. 4 is a slightly reduced scale side view showing my device at the end of the long range extension stage.

Fig. 5 is a partial side view partly in section showing the spear end portion in the final extension stage;

Fig. 6 is a view in section taken on line 6—6 of Fig. 5;

Fig. 7 is a view partly in section taken on line 7—7 of Fig. 6; and

Fig. 8 is a side view of the trigger mechanism partly in section.

As seen in Figs. 1 and 2, my fish spearing device includes a cylindrical body 14 closed at its base by a handle plug 15. A bearing 16 is pressed into the forward end of the body 14 and secured therein by suitable means such as the stud 22, the bearing having an annular lip 17 which engages the forward edge of the body.

Slidably mounted within the body 14 is a telescoping spear assembly 18 which includes a barrel 19, a carrier 20, and a spear 21. The barrel has a piston 23 formed at its base which seats on a power means such as the helical spring 24, which in turn seats on the handle plug 15. The forward surface 25 of the piston 23 abuts the base 26 of the bearing 16 when in the extended position.

The carrier 20, which is telescopically received within the barrel 19, has an enlarged tapered portion 27 at its base and a reduced tapered portion 28 at its forward end. On the forward end of the barrel 19 is a reduced tapered portion 29, the inner surface of which is frictionally engaged by the outer surface of the carrier base tapered portion 27 upon extension as shown in Fig. 3. The inner surface of the carrier forward tapered portion 28 is designed to be frictionally engaged upon extension by the outer surface of the spear enlarged tapered portion 30.

A trigger mechanism 31 shown in Figs. 2 and 8 is mounted on the barrel and in the preferred form engages the forward surface of the stop ring 32 of the spear which is located near the spear point 33. The trigger mechanism includes a spring-biased lug 34 mounted in a housing 35 and connected to a hand operating lever 36 which is pivoted on the housing brace at 37.

When the trigger mechanism is released the power means shoots the complete telescoping spear assembly 18 to the forward end of the body 14. The forward movement of barrel 19 may be instantaneously transmitted to the carrier 20 in various manners. Also the resulting forward movement of carrier 20 may likewise be instantaneously transmitted to spear 21. This transmission of forward movement is required to impart the required inertia to the elements for independent movement of the carrier and spear when the barrel is stopped and, if desired, independent movement of the spear when the carrier is stopped. The preferred embodiment shown in the drawing comprises (Fig. 4) a bearing portion 48 on the barrel which abuts a base ring 41 on the carrier which in turn abuts a stop ring 32 on the spear. When the piston 23 hits the bearing 16, the movement of the barrel is halted and the carrier 20 and spear 21 continue onward as one unit. When the base tapered portion 27 of the carrier engages its complementary forward tapered end portion 29 of the barrel, a secure frictional fit is made and the spear continues to travel outwardly due to its momentum. When the base tapered portion 30 of the spear strikes the forward tapered portion 28, a second secure frictional fit is made, and assuming a fish has been hit, my fish spearing device may be drawn back rapidly to gaff the fish. It will be noted that only the barrel is directly contacted by the power means and that the carrier and spear travel outwardly due to their momentum.

Because of the frictional fits obtained upon extension of the barrel, carrier and spear, the gaffed fish may be easily handled and taken from the water without collapse of the telescoping spear assembly. In this manner the danger of losing a fish during the very critical period after setting the gaff is minimized. Further it will be appreciated that the three extensible members which in the preferred form are about three feet in length provide a range of about nine feet or more.

To provide for use of my spear at distances less than the fully extended length, six feet instead of nine for instance, a connecting means is provided between the carrier 20 and the spear 21.

As shown in Figs. 6 and 7 this may comprise a stud 39 which is threaded into the stop ring 32 and which extends through an arcuate slot 40 in a base ring 41 rotatably mounted on the tubular forward end portion 42 of the carrier 20 (see Fig. 7). The edge of the tubular portion 42 is bent outwardly to form a retaining ring 45 which is received in the annular recess 46 of the base ring 41. A raised portion 47 is formed at the juncture between the tubular portion 42 and the forward tapered portion 28 to prevent movement of the base ring 41. The arcuate slot 40 communicates with an arcuate cut-out portion 43 in the base ring 41 and is of a size such that the head 44 of the stud passes easily therethrough. The slot 40 is of a size such that the stud head 44 cannot pass therethrough. The fit between the base ring 41 and the carrier tubular portion 42 is a friction fit to prevent accidental rotation of the base ring 41. Also the stud 39 may be tightened sufficiently to insure a tight fit thereby preventing accidental movement.

If the fisherman should desire to change the range of his spear, he would before firing twist the base ring 41 to the proper position. When the cut-out portion 43 is aligned with the stud head 44, the spear 21 is free to travel outwardly from the carrier 20; however, when the slot 40 is in alignment with the stud head 44, no relative movement between the carrier and spear can occur. In this manner, therefore, it is possible for a fisherman to spear a fish at a range of about three to six feet as well as at the long range of nine feet and more, the length of the barrel and each of the tubes being about three feet.

To assist in the accurate movement of the spear 21 toward a target, the barrel is provided with a bearing portion 48, the carrier with bearing portions 49 and 42, and the spear with bearing portion 50.

The power means is shown in the drawings as being a helical spring. However, it should be understood that other power means may be employed, such as compressed air, rubber bands, carbon dioxide, or a powder charge.

The preferred modification shown in the drawings has a spear assembly which includes three telescoping members, and it is of course apparent that two could be used, as well as four and more, the criterion being the utilization of momentum in carrying forward one of the tubular sections as distinguished from direct engagement with the power means.

I claim:

1. A fish spear comprising a body having a base and a forward end, a bearing mounted in the forward end, a telescoping spear assembly slidably disposed in said body including a barrel, a carrier slidably disposed in said barrel, and a spear slidably disposed in said carrier, said barrel having a reduced tapered forward end, said carrier having an enlarged tapered base and a reduced tapered forward end, said spear having an enlarged tapered base, the forward end of said barrel receiving the base of said carrier to form a friction fit upon extension, the forward end of said carrier receiving the base of said spear to form a friction fit upon extension, power means disposed within said body, said barrel having a piston formed at its base in sliding contact with said body and in seating contact with said power means whereby the power means forces the piston outwardly on release of said power means, trigger means operable to release said power means, and means for transmitting the forward motion of said barrel to said carrier and said spear.

2. In a fish spear, a telescoping spear assembly comprising a barrel, a carrier slidably disposed within said barrel, and a spear slidably disposed in said carrier, said barrel having a reduced tapered forward end, said carrier having an enlarged tapered base and a reduced tapered forward end, said spear having an enlarged tapered base, the forward end of said barrel receiving the base of said carrier to form a friction fit upon extension, the forward end of said carrier receiving the base of said spear to form a friction fit upon extension, power means operably connected to said barrel for instantaneously imparting rapid motion to said telescoping spear assembly, means for abruptly stopping movement of said barrel after movement of the same through a predetermined distance to allow further movement of the carrier and spear together and then the spear alone through inertia, trigger means operable to release said power means, and connecting means for coupling said carrier and spear together to prevent relative movement between said spear and said carrier and to receive the forward moving force of said barrel.

3. A fish spear comprising a body having a base and a forward end, a bearing mounted in the forward end, a telescoping spear assembly slidably disposed in said body including a barrel, a carrier slidably disposed in said barrel, and a spear slidably disposed in said carrier, said barrel having a reduced forward end, said carrier having an enlarged base and a reduced forward end, said spear having an enlarged base, the forward end of said barrel receiving the base of said carrier to limit relative outward movement of the same with reference to the barrel, the forward end of said carrier receiving the base of said spear to limit relative outward movement of the same with reference to the carrier, power means disposed within said body, said barrel having a piston formed at its base in sliding contact with said body and in seating contact with said power means whereby the power means forces the piston outwardly on release of said power means, trigger means operable to release said power means, and means for transmitting the forward motion of said barrel to said carrier and said spear.

References Cited in the file of this patent

UNITED STATES PATENTS

| 1,755,646 | Halstead | Apr. 22, 1930 |
| 2,187,807 | Muckey | Jan. 23, 1940 |

FOREIGN PATENTS

| 908,263 | France | Apr. 4, 1946 |